3,072,615
POLYPYRROLIDONE STABILIZATION
Richard G. Riedesel, Stillwater Township, Washington County, Minn., assignor to Minnesota Mining and Manufacturing Company, St. Paul, Minn., a corporation of Delaware
No Drawing. Filed Feb. 3, 1958, Ser. No. 712,689
5 Claims. (Cl. 260—78)

This invention relates to the stabilization of polymer systems, and more particularly to a process for the stabilization of polypyrrolidone toward thermal molecular weight degradation.

The synthetic linear polyamide resin prepared by polymerizing pyrrolidone is a useful substance which possesses physical properties that render its application in various areas highly advantageous. Thus, for example, the polymer has a tendency to absorb an amount of water, and when produced in the form of fibers, the cloth woven from such fibers is readily dyed and has desirable physical properties. It can likewise be employed for the production of molding compounds, films, etc. The preparation and the use of the polymers of the invention are disclosed in U.S. Patent 2,638,463.

While it has been possible heretofore to produce fibers from polypyrrolidone by processes of wet or dry spinning from solutions of polypyrrolidone in formic acid, as disclosed in U.S. Patent 2,711,398, it has been found that it is difficult to extrude, mold or melt-spin polypyrrolidone because of its instability towards heat. When polypyrrolidone as produced by the process of U.S. Patent 2,638,463 is heated to temperatures in the region of its melting point, the polymer is quickly degraded into what is apparently monomeric pyrrolidone, which boils, thereby causing the molten mass to foam, while the monomer is lost through evaporation.

It is known that in the processes presently available for the polymerization of pyrrolidone, the polymer must be washed to remove the catalyst and any remaining monomer since they apparently tend to facilitate thermal decomposition. Heretofore, the removal of these substances from polymers of pyrrolidone has commonly been attempted by washing with water. While the stability toward depolymerization is thereby improved, nevertheless the rate of degradation to monomer upon heating is still so rapid as to render melt-spinning very difficult. Other solvents, such as alcohols, acetone and the like have been employed for washing purposes, but the results therewith are no better than those obtained using water, except as respects removal of colored impurities. By treating polymers of pyrrolidone with dilute aqueous carboxylic acids, such as formic, acetic, propionic and butyric acids at ambient temperatures, it is possible to further improve the stability of the polymer at high temperatures. This improvement is believed to be at least partly due to more complete removal of inorganic impurities, such as the metallic ions of the catalyst and certain contaminants, which seem to decrease the stability of the polymer. Thus it is possible to reduce the evolution of monomer from a sample of polypyrrolidone by as much as 600 percent or more if a dilute aqueous solution of such an acid is used to treat the polymer instead of or in addition to a water or solvent wash. This degree of improvement is ordinarily sufficient to enable successful extrusion, molding or melt spinning of the polymer.

It has been found, however, that this treatment does not substantially affect the inherent viscosity or the melt viscosity of the polymer (the inherent viscosity being a measure of the average molecular weight). Since the molecular weight of any lot of freshly prepared polypyrrolidone ordinarily contains a broad molecular weight distribution, it is often desirable to remove the lower polymers and thus raise the inherent viscosity, melt viscosity and average molecular weight of the polymer. This has the effect of further stabilizing the polymer to degradation by heat and also of strengthening articles fabricated from it. Heretofore, no method for removing such low polymers from polypyrrolidone has been described.

It is an object of this invention to provide a process for increasing the stability of polymers of pyrrolidone toward heat. It is another object of the invention to purify polypyrrolidone so as to remove water-soluble impurities and lower molecular weight polymer therefrom. It is another object of the invention to provide a stabilized polypyrrolidone. Other objects of the invention will be apparent from the disclosure herein made.

In accordance with the above and other objects of the invention, it has been found that water-soluble inorganic impurities and pyrrolidone monomer as well as the relatively undesirable lower molecular weight polypyrrolidone can be removed from crude polypyrrolidone which contains a broad molecular weight distribution, thereby producing a purified polypyrrolidone having greatly improved extrusion, molding and melt-spinning properties, by slurrying the crude polymer with a dilute aqueous solution of a lower aliphatic carboxylic acid at a temperature in the range of at least about 70° C., ranging upward to the boiling point of the aqueous acid which is used, or even higher if super-atmospheric pressures are employed. The slurrying is continued for a time sufficient to permit substantially complete penetration of the polymer mass by the lower aliphatic carboxylic acid used, removing the hot lower aliphatic carboxylic acid solution and washing the remaining insoluble polymer. Preferably, lower fatty acids are employed in the process, for example, formic acid, acetic acid, propionic acid, butyric acid and the like, as well as mixtures thereof, may be used. Concentration of the dilute aqueous acid which is used in the process can range from about 0.5 percent to about 25 percent, while concentrations of about 1 percent to about 10 percent are ordinarily preferred. The ordinarily preferred temperature at which the slurry is maintained is the boiling temperature because of the ease of control. This is usually approximately 100° C. but may vary owing to the constitution of the solution or the use of a pressure other than atmospheric. Temperatures as low as about 70° C. are operative and may be preferred in plant scale operations. The polymer which is treated can be material just removed from the polymerization reactor, or previously alcohol or water-washed polymer can be employed. It is only necessary that the material be in a convenient state of division so that the entire mass of the polymer is contacted. Obviously, if finer particles are treated shorter treatment times will be necessary, all other things being equal. The amount of solution used is not critical, except that it is obvious that a volume at least sufficient to wet the polymer thoroughly must be employed. The use of an excess amount of the acidic agent on the other hand is not disadvantageous. Although a single treatment is ordinarily sufficient, the operation can be repeated one or more times. Preferably, from 1 to 5 volumes of acidic washing agent are employed. In principle, the treatment consists of contacting the finely divided polymer of pyrrolidone with the hot dilute acidic agent, and removing the desirable high molecular weight polymer from the resulting slurry while hot, as for example, by filtration, centrifugation, and the like. The treated polymer, which is substantially pure white in color, is then dried and is ready for use.

Copolymers of pyrrolidone are equally well adapted to treatment by the process of the invention and as used herein, the term "polymer" includes both homopolymers and copolymers of pyrrolidone.

The improved polypyrrolidone produced by the process of the invention can be converted into any desired form, such as fibers, yarns, fabric, molded articles, films, monofilaments, extruded articles and the like. The physical properties of the polymer suffer no adverse effects from the process of the invention. For example, fibers produced by the process have excellent strength and good dyeability and also possess the ability to absorb an amount of water, thus approximating the properties of certain natural fibers in this respect.

The following examples will illustrate the process for the stabilization of polypyrrolidone against viscosity changes. In the examples, all parts are by weight and the measurements of inherent viscosity, expressed in deciliters per gram, are made according to a standard method, using an Ostwald viscometer as the measuring means for a solution of the polypyrrolidone in concentration of 0.2 percent in m-cresol. The inherent viscosity value thus determined is a direct function of the melt viscosity. The method is described in Textbook of Polymer Chemistry, F. W. Billmeyer, Jr., Interscience Publishers, New York, 1957, chapter 14.

*Example 1*

About 10 parts of freshly prepared polypyrrolidone previously washed with water are slurried in a solution of 23 parts of glacial acetic acid in 433 parts of distilled water at the boiling temperature of the solution (approximately 100° C.). After 30 minutes, during which it is agitated at the boiling temperature, the slurry is filtered at the boiling temperature. The resulting first filtrate is diluted up to 1500 parts with warm tap water and allowed to stand at ambient temperature (approximately 25° C.) for two days. At the end of this time the diluted material is filtered at ambient temperature and the resulting precipitated solid material is dried. The insoluble material collected during the first filtration is washed repeatedly with warm tap water until the effluent is neutral and then dried. The two solid fractions are weighed and their inherent viscosities are taken, the results being as follows:

|  | Original Sample | Solid Fractions | |
| --- | --- | --- | --- |
|  |  | From First Filtration | From Second Filtration |
| Weight (parts by weight) | 10 | 8.2 | 0.9 |
| Inherent Viscosity | 1.33 | 1.56 | 1.01 |

The 0.9 part of the original sample not accounted for in the two solid fractions probably consists of water-soluble monomer and inorganic impurities and is lost in the filtrates and effluents. Essentially all of the inorganic material present in the original sample has been removed. Thus the lower polymer, the monomer and the inorganic fractions may be removed in this way from a batch of polypyrrolidone containing a broad molecular weight distribution so that the remaining high molecular weight fraction can be fabricated into articles which are free from irregularities and which are relatively stable at elevated temperatures.

*Example 2*

The following table compares the resistance to thermal degradation over a cycle of 30 minutes at 250° C. under high vacuum of three lots of polypyrrolidone which have been subjected to various slurry treatments subsequent to polymerization.

| Lot | Slurry Treatment | Inherent Viscosity | | Weight Loss During Cycling (percent) |
| --- | --- | --- | --- | --- |
|  |  | Before Cycling | After Cycling |  |
| A | Three cycles of water washing ½ hr. at 25° C. and filtering. | 2.89 | 1.19 | 31.6 |
| B | Slurry 1 hr. at 25° C. in 4 percent aqueous acetic acid, filter and three cycles of water washing as in Lot A. | 2.88 | 1.35 | 7.3 |
| C | Slurry 3 hrs. at 80°–85° C. in 4 percent aqueous acetic acid, filter at 80°–85° C., water wash 1 hr. at 83° C. and filter at 83° C. | 2.84 | 1.65 | 4.1 |

The amount of inorganic ash retained after the slurry treatment of lot A is of the order of 0.3 to 0.4 percent (based on the weight of polymer present), after the slurry treatment of lot B is of the order of .01 to .04 percent and after the slurry treatment of lot C is less than about .01 percent.

The virtual elimination of active inorganic constituents (indicated by the reduction of ash), of pyrrolidone monomer and of low molecular weight polypyrrolidone all contribute to the thermal stability of the polymer given the slurry treatment of lot C.

This data is particularly interesting since the heat cycle used for testing is similar to the heat cycle to which the polymer is subjected when it undergoes melt spinning.

*Example 3*

The following table shows that the beneficial effects of the process of the present invention are similar whether the process is carried out at 75° C. or at approximately 100° C. The resistance to thermal degradation is measured over the same heat cycle as the lots of Example 2.

| Lot | Treatment | Inherent Viscosity | | Weight Loss During Cycling (percent) |
| --- | --- | --- | --- | --- |
|  |  | Before Cycling | After Cycling |  |
| A | Slurry 4 hrs. at 75° C. in 4 percent aqueous acetic acid, filtering at 75° C., washing 1 hr. at 75° C. in water and filtering at 75° C. | 2.80 | 1.47 | 5.7 |
| B | Slurry 4 hrs. at reflux in 4 percent aqueous acetic acid, filter at reflux temperature, wash 1 hr. at reflux temperature in water and filter at reflux temperature. | 2.54 | 1.43 | 5.1 |

*Example 4*

When the procedure of Example 2, lot C is repeated, but using aqueous 5 percent formic acid, substantially the same results are obtained. Likewise, the use of dilute aqueous propionic acid gives greatly improved heat stability, e.g. toward evolution of monomer on heating.

*Example 5*

A copolymer of pyrrolidone with caprolactam which contains about 3 parts of pyrrolidone for each part of caprolactam is prepared as follows: A container equipped for agitation and distillation under reduced pressure is charged with 50 parts of pyrrolidone, 50 parts of ε-caprolactam and 215 parts of xylene. The reaction mixture is warmed and a solution of 2.2 parts of 85 percent potassium hydroxide in 3 parts of water is added dropwise while distillation is carried out under a pressure of about 18 millimeters of mercury at a temperature of about 45° C. The temperature gradually rises and heating and distillation are continued until the temperature of the contents of the vessel is about 90° C. The residue is then cooled to about 25° C. and 125 parts of anhydrous heptane and 1.47 parts of N-acetyl pyrrolidone are added to the reaction mixture. The mixture is stirred for about 2 days at 25° C., during which time an insoluble granular copolymer separates, and the copolymer is removed by filtration. A sample of this copolymer which is treated by the process of lot C of Example 2 has superior resistance to thermal degradation, as compared with a second sample treated by the process of lot A of the same example.

What is claimed is:

1. The process which comprises treating finely divided polypyrrolidone containing low molecular weight polymer with a dilute aqueous solution of a lower fatty acid at a temperature above about 70° C., to dissolve the said low molecular weight polymer, and recovering the insoluble, higher molecular weight polymer from the aqueous solution.

2. The process which comprises treating finely divided polypyrrolidone containing low molecular weight polymer by slurrying the finely divided polypyrrolidone after polymerization thereof with an aqueous solution containing from about 0.5 to 25 percent of a lower fatty acid, at a temperature above about 70° C., for time sufficient to bring about solution of the low molecular weight polymer in the said solution, and thereafter recovering the insoluble, higher molecular weight polymer from the said aqueous solution.

3. The process which consists essentially of slurrying finely divided polypyrrolidone containing low molecular weight polymer with several volumes of an aqueous solution containing from about 0.5 to 25 percent of a lower aliphatic carboxylic acid at a temperature above about 70° C. to bring about solution of low molecular weight polymer, and recovering the insoluble polymer from the solution.

4. The process according to claim 3, wherein the acid is acetic acid.

5. The process according to claim 3, wherein the acid is propionic acid.

References Cited in the file of this patent

UNITED STATES PATENTS

| | | |
|---|---|---|
| 2,241,322 | Hanford | May 6, 1941 |
| 2,356,516 | Hagedorn | Aug. 22, 1944 |
| 2,548,845 | Neumann | Apr. 10, 1951 |
| 2,638,463 | Ney | May 12, 1953 |
| 2,657,972 | Woodward | Nov. 3, 1953 |

FOREIGN PATENTS

| | | |
|---|---|---|
| 205,015 | Australia | Jan. 31, 1957 |
| 782,452 | Britain | Sept. 4, 1957 |

OTHER REFERENCES

Hanford et al.: J. Poly. Sci., vol. 3 (1948), pp. 167–172.